June 1, 1971 S. STRELZOFF ET AL 3,582,313
PRODUCTION OF NITROPHOSPHATE FERTILIZER AMMONIUM NITRATE, AND
CALCIUM SULFATE OR CALCIUM CARBONATE
Filed Oct. 9, 1968
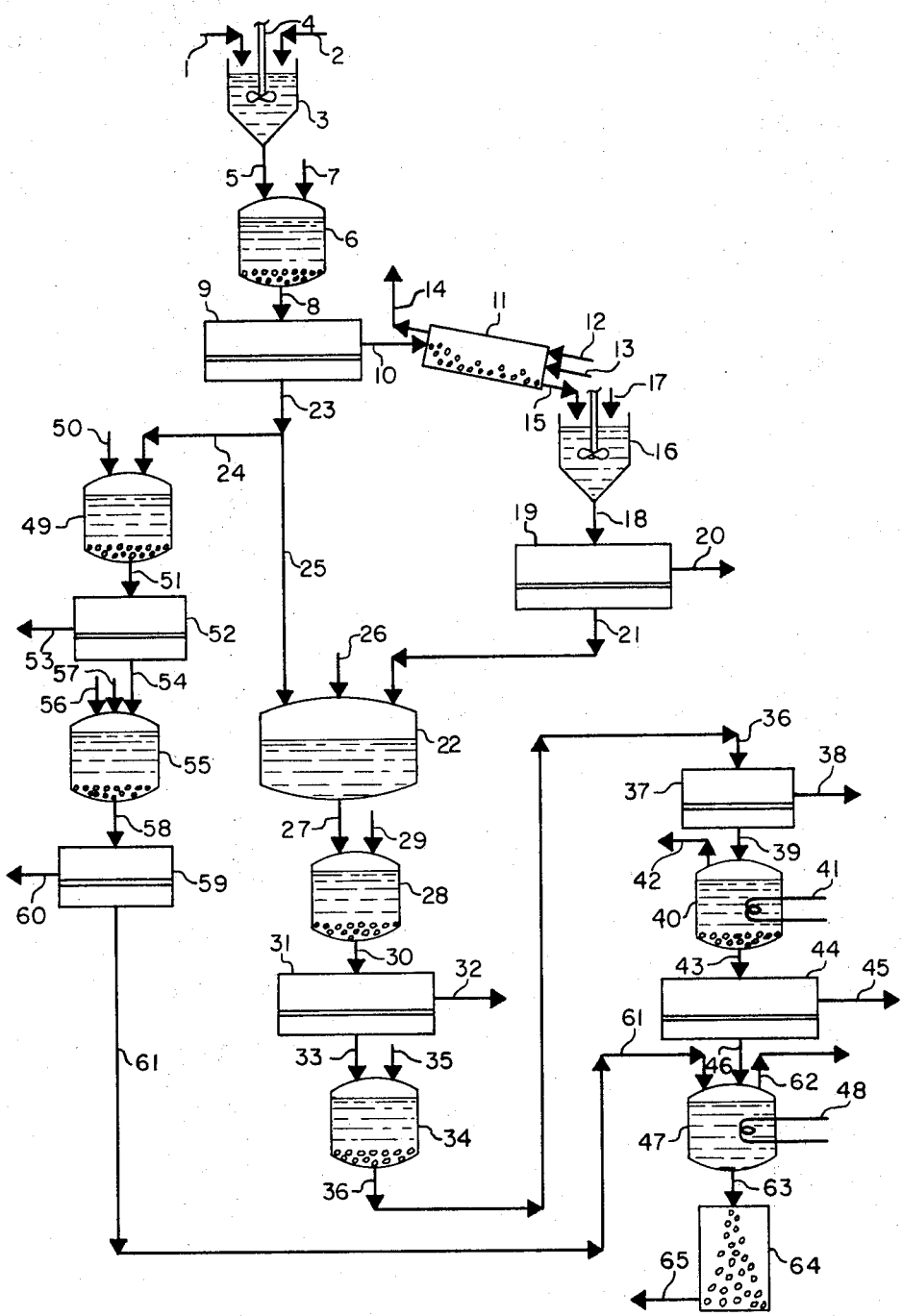
SAMUEL STRELZOFF
SYDNEY ATKIN
INVENTORS.
BY J. T. Chaboty
AGENT United States Patent Office
3,582,313
Patented June 1, 1971

3,582,313
PRODUCTION OF NITROPHOSPHATE FERTIL-
IZER, AMMONIUM NITRATE, AND CALCIUM
SULFATE OR CALCIUM CARBONATE
Samuel Strelzoff, New York, N.Y., and Sydney Atkin,
Springfield, N.J., assignors to Chemical Construction
Corporation, New York, N.Y.
Filed Oct. 9, 1968, Ser. No. 766,139
Int. Cl. C05b 11/06
U.S. Cl. 71—35                          8 Claims

ABSTRACT OF THE DISCLOSURE

Nitrophosphate fertilizer is produced by the nitric acid digestion of phosphate rock. The pH of the initial digestion solution is raised to the range of about 1.8 to 2.5 by ammonia addition, to precipitate impurities including a major portion of fluoride and iron phosphate. The solid precipitate is filtered from the clear solution, and the solid filter cake is calcined at elevated temperature to volatilize fluoride and decompose iron phosphate into a nitric acid-insoluble form. The calcined cake is digested with nitric acid to recover phosphate and aluminum values in solution, and the resulting slurry is filtered and the solid filter cake containing iron compounds and silica is discarded. The clear filtrate is combined with the initial clear solution previously formed by filtration to remove solid fluoride and iron impurities, and the combined solution is preferably further acidified to reduce the pH to a low and highly acid value. A soluble salt such as ammonium sulfate or potassium sulfate, which has an anion which forms an insoluble solid salt with the calcium cation, is added to the combined solution, and an insoluble solid calcium salt is precipitated. Filtration removes the solid calcium salt, and ammonia is added to the remaining solution to raise the pH above 3.0 and precipitate remaining impurities. After removal of precipitated solid impurities by filtration, the final solution is processed by water removal to produce solid nitrophos fertilizer, usually together with ammonium nitrate as a co-product.

BACKGROUND OF THE INVENTION

Field of the invention

The invention relates to the digestion of phosphate rock, shale or the like with nitric acid, and the processing of the resulting solution with ammonia and a sulfate salt or the like, to respectively precipitate impurities and solid calcium sulfate, so as to produce a final purified solution from which a solid nitrophosphate fertilizer containing a high proportion of water-soluble phosphate is produced by water removal. The term "phosphate rock" as employed herein will be understood to encompass the various types of phosphate shale and other phosphatic materials of similar compositions, as well as phosphate rock per se.

Description of prior art

The conventional procedure for the processing of phosphate rock to produce soluble phosphates for usage as fertilizers entails the treatment of the ground rock with sulfuric acid. The resultant digestion of the rock, which takes place over a time interval in a den or the like, results in the production of a normal superphosphate product, in which the phosphate values are solubilized and thereby become available to plants when applied to the soil. In some instances, a more highly concentrated product is produced, by reacting the phosphate rock with aqueous sulfuric acid to produce a slurry of solid calcium sulfate in phosphoric acid solution. The solid calcium sulfate is removed by filtration, and the phosphoric acid solution is concentrated and reacted with further phosphate rock to produce triple superphosphate fertilizer.

The acidulation or digestion of phosphate rock with nitric acid has been described in U.S. Pat. No. 2,689,175 and U.S. patent application No. 680,757 filed Nov. 6, 1967, and now abandoned. In the patented process, the ground phosphate rock is reacted with aqueous nitric acid, and the sulfate radical required for the elimination of calcium via the formation of solid calcium sulfate is supplied by adding an ammonium sulfate solution to the reaction mixture. These reagents are combined in the proper proportion to produce a slurry of filterable calcium sulfate, or gypsum, in an aqueous solution of phosphoric acid and ammonium nitrate. The slurry is filtered, and the clear solution is ammoniated and concentrated in stages, to principally produce ammonium phosphate and ammonium nitrate. French Pat. No. 705,887 provides a similar procedure, and descriptions of prior commercial techniques are given in Chemical Engineering, v. 74, No. 22, dated Oct. 23, 1967, at pages 86–88, 90, 134–136. The recovery of valuable byproduct such as aluminum and uranium values from phosphatic material, specifically leached zone phosphates, is described in U.S. Pat. No. 3,126,249.

SUMMARY OF THE INVENTION

In the present invention, a nitrophosphate product having high availability and water-solubility of phosphate values is produced, by the nitric acid acidulation of phosphate rock and subsequent ammoniation in an improved process sequence which features ammoniation of the initial digestion solution to precipitate impurities such as fluorine and iron, calcining of the precipitate to volatilize fluorine and convert iron to an acid-insoluble state, and nitric acid digestion of the calcined precipitate to solubilize and recover phosphate and aluminum values.

The feed phosphate rock, which may be initially ground to a powder or the like to aid in reaction, is digested with a first nitric acid stream to form a solution containing dissolved phosphate. Ammonia is added to the solution to raise the pH of the solution to the range of about 1.8 to 2.5, which causes the formation of a solid precipitate containing most of the fluoride and iron phosphate impurities. The solid precipitate is separated from the clear solution and calcined at an elevated temperature generally in the range of 500° C. to 1000° C. to volatilize fluorine-containing impurities and convert iron phosphate to acid-insoluble compounds by thermal decomposition. The calcined precipitate is digested with a second nitric acid stream, to solubilize and dissolve phosphate and aluminum values. Residual solid material from this second digestion step, consisting mostly of insoluble iron compounds and silica, is discarded. The clear liquid solution from the digestion of the calcined precipitate is added to the initial clear solution, and the pH of the combined clear solution may be lowered below 1.0 by the addition of further nitric acid. In any case, a soluble salt such as ammonium sulfate or potassium sulfate, which has an anion which forms an insoluble solid salt with the calcium cation, is added to the solution; so that calcium nitrate in the combined solution is reacted to form a soluble nitrate and an insoluble solid calcium salt, such as calcium sulfate, which is removed from the solution. Ammonia is then added to the clear resulting solution, to raise the solution pH to the range of about 3.0 to about 4.5 and form a solid precipitate containing impurities which is filtered from the solution. The final clear solution principally contains dissolved ammonium phosphate, mostly present as mono-ammonium acid phosphate, together with ammonium nitrate, and is processed by water removal to produce a nitrophos product. The nitrophos is generally produced by partial vacuum evaporation and crystallization, to produce a solid nitrophos precipitate in an aqueous ammonium nitrate mother liquor, which is separated from the solid nitrophos and further concentrated to produce a substantially anhydrous ammonium nitrate melt which is prilled or otherwise processed to form discrete particles of solid ammonium nitrate fertilizer.

The process of the present invention provides several salient novel features and advantages. The calcining step is highly important, because the calcining of the first ammoniation precipitate serves to volatilize more than 80% of the fluorine and decompose the iron phosphate, thus making the iron insoluble in the following redigestion step. The process permits the recovery of aluminum, uranium and rare earth values from the second ammoniation precipitate, typically by such procedures as described in U.S. Pat. No. 3,126,249. In this respect, after recovery by byproduct metals values, the residual solution can be recycled to the present process to recover phosphate values. A relatively pure calcium sulfate or gypsum byproduct can be produced, which is suitable for usage in the manufacture of building materials or compositions or the like. It has been determined that the filtration rates of the various slurries and precipitates in the process of the present invention are improved, as compared to prior art procedures, principally because the calcining step destroys the gelatinous slimes or the like which are formed or present in conventional processes for acid digestion of phosphate rock. A nitrophosphate product is produced in which more than 90% of the total phosphate is water soluble. In this respect, the removal of impurities such as fluorine, iron and calcium helps to prevent the reversion of phosphate in the final nitrophosphate product to the citrate-insoluble state. As will appear infra, a feed-grade dicalcium phosphate co-product may also be readily produced in conjunction with the present invention by usage of a portion of one of the process streams in accordance with the procedure of U.S. patent application No. 680,757 filed Nov. 6, 1967, and now abandoned. Finally, the co-product ammonium nitrate forms a superior prilled product when the mother liquor solution is concentrated to an anhydrous melt and prilled, because the presence of small amounts of ammonium sulfate and ammonium phosphate in the final solid prills produces an ammonium nitrate prill structure and composition which resists disintegration at a transition point.

It is an object of the present invention to provide an improved process for the production of nitrophosphate fertilizer by the nitric acid digestion of phosphate rock.

Another object is to remove fluoride and iron impurities in an improved manner during the processing of phosphate rock with nitric acid.

A further object is to improve filtration rates of slurries during the processing of phosphate rock with nitric acid, in which precipitation from solutions is obtained by ammoniation or by the addition of a soluble salt having an anion which forms an insoluble solid salt with the calcium cation.

An additional object is to produce an nitrophos product in which most of the phosphate is in a water-soluble form, by the nitric acid acidulation of phosphate rock and subsequent ammoniation in two stages.

An object is to recover aluminum, uranium and rare earths values from phosphate rock in a concentrated byproduct precipitate, during the nitric acid digestion of phosphate rock and subsequent ammoniation.

Still another object is to produce relatively pure by-product gypsum during the nitric acid digestion of phosphate rock to produce nitrophosphate fertilizer.

Still a further object is to produce an improved form of ammonium nitrate prill composition during the nitric acid digestion of phosphate rock followed by ammoniation and separation of solid nitrophosphate from residual aqueous ammonium nitrate mother liquor.

Finally, an object is to provide a process for the production of nitrophos by the nitric acid digestion of phosphate rock in which feed grade dicalcium phosphate may be produced as a co-product of the process by selective ammoniation of a portion of an intermediate purified process stream.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Ground phosphate rock stream 1 and aqueous nitric acid stream 2 are passed into digester 3, and the phosphate rock is digested and solubilized in unit 3. In addition to the reaction of tricalcium phosphate with nitric acid, small amounts of calcium carbonate and calcium fluoride present in stream 1 will react with stream 2 to yield calcium nitrate and volatile off-gases such as carbon dioxide and hydrogen fluoride. A portion of the hydrogen fluoride reacts and remains in the liquid phase as combined fluoride, either as a fluoride or silicofluoride. The phosphate rock stream 1 will generally analyze in the range of about 25% to 38% or higher equivalent phosphorus pentoxide content, about 45% to 50% equivalent calcium oxide content, and about 2.5% to 4% equivalent fluorine content, all in percentages by weight. The aqueous nitric acid stream 2 will generally contain in the range of about 20% to 70% nitric acid content by weight, and sufficient flow rate of stream 2 relative to stream 1 is provided to maintain a pH in the range of about 0.3 to 1.5 in unit 3. A temperature level generally in the range of about 55° C. to 80° C. is maintained within digester 3, and agitator or stirrer 4 is provided to circulate the reactants within unit 3 and produce a uniform solution, which may contain a small amount of slimy sludge insoluble in the acid solution. As mentioned supra, the slimy sludge is entrained in the initial precipitate and is eliminated in the calcining step, as will appear infra.

The aqueous solution 5 discharged from unit 3 principally contains calcium nitrate and an acid salt of calcium phosphate, generally monocalcium phosphate. Stream 5 is passed into ammoniation vessel 6 together with anhydrous or aqueous ammonia stream 7, which serves to raise the pH of the solution to a level generally in the range of about 1.8 to about 2.5, and to form a solid precipitate containing impurities such as fluorides and iron phosphate, together with the undigested slimy sludge. The resulting slurry stream 8 discharged from unit 6 is passed to solids filter 9, from which a solid filter cake stream 10 is removed and processed in accordance with the present invention.

Stream 10 contains calcium phosphate values, together with fluoride and iron phosphate impurities, a small proportion of aluminum values and the slimy residual sludge from digestion in unit 3. Stream 10 is passed into calciner 11, which generally consists of a rotary kiln or the like. Fuel stream 12, which usually consists of a fluid hydrocarbon fuel such as residual oil, fuel oil or natural gas, is passed into kiln 11, together with combustion air stream 13, and the combustion of stream 12 within unit 11 serves to generate a highly elevated temperature within kiln 11, generally in the range of about 500° C. to 1000° C. Solids filter cake stream 10 is calcined within unit 11, with resultant volatilization of most of the contained fluorine or fluoride compounds, which are discharged from fliln 11 in flue gas stream 14. In this manner, the discharge of stream 14 serves to eliminate a major portion of the fluorine from the subsequent processing steps and products. In addition, iron phosphate contained in the solids feed is converted to insoluble iron compounds in unit 11.

The resultant calcined filter cake solids stream 15 discharged from unit 11 is passed into digester 16 together with aqueous nitric acid stream 17. Unit 16 is similar in configuration and function to unit 3 described supra, and serves to digest and solubilize a major portion of stream 15, thus most of the phosphate and aluminum values in stream 15 are dissolved into solution in unit 16 while iron compounds and silica remain in a solid undissolved state. A temperature level generally in the range of about 60° C. to 90° C. is maintained in unit 16. The resulting slurry stream 18 discharged from unit 16 is passed to solids filter 19, from which a solid filter cake stream 20 is removed and discharged to waste. Stream 20 principally contains silica and iron compounds derived from stream 15 and the discharge of stream 20 thus serves to eliminate a major portion of the iron from the subsequent processing steps and products.

A clear solution stream 21 containing dissolved phosphate and aluminum values is removed from filter unit 19 and passed to solution combining and acidification vessel 22. Returning to filter unit 9, a clear aqueous solution stream 23 containing dissolved calcium nitrate, ammonium nitrate and phosphate values in the form of phosphoric acid and monoammonium acid phosphate is removed from unit 9. Stream 23 is preferably divided into stream 24, which is processed for the recovery of feed grade dicalcium phosphate in a manner to be described infra, and stream 25, which is passed to solution combining vessel 22 for combination with stream 21. The combined liquid phase in vessel 22 will generally have a pH below 2.5, and the pH of the combined solution is preferably adjusted to a value below 1.0 and preferably in the range of 0.3 to 0.7 by adding concentrated aqueous nitric acid stream 26 to vessel 22. Stream 26 will generally contain in the range of about 35% to 70% nitric acid content by weight.

The resulting acidified solution stream 27 removed from vessel 22 is now passed to conversion vessel 28, in which calcium ions are precipitated as a solid calcium salt by the addition of a soluble salt to the solution, which soluble salt has an anion which forms an insoluble solid salt with the calcium cation in the solution. The preferred soluble salt added to vessel 28 via stream 29 is ammonium sulfate or potassium sulfate, however other soluble sulfates, carbonates such as ammonium carbonate, or the like may be employed as stream 29 within the scope of the present invention. In this preferred embodiment of the invention, stream 29 consists of an aqueous ammonium sulfate solution. Calcium ions are precipitated in unit 28 as insoluble calcium sulfate, and a slurry of precipitated solid calcium sulfate in an aqueous solution phase containing ammonium nitrate, mono-ammonium phosphate and phosphoric acid is produced in unit 28. The pH of the slurry in unit 28 is maintained in the range of about 0.5 to 2.0, and the temperature of the slurry is generally in the range of about 50° C. to 100° C. The resulting slurry stream 30 discharged from unit 28 is passed to solids filter 31, from which a solid filter cake stream 32 is removed. Stream 32 consists of relatively pure calcium sulfate or gypsum, and may be discharged to waste or employed in the manufacture of building materials or compositions or the like. The removal of stream 32 serves to eliminate most of the calcium from the subsequent processing steps and products.

A clear aqueous solution stream 33 containing dissolved ammonium nitrate, phosphoric acid and monoammonium acid phosphate is discharged from unit 31 and passed to ammoniation vessel 34, to which ammonia is added via stream 35 which raises the solution pH to the range of about 3.0 to 4.5 and precipitates an impurity-laden solids phase. In addition, the anhydrous or aqua ammonia stream 35 reacts within unit 34 with free phosphoric acid in the process solution, to form further monoammonium phosphate. A minor proportion of diammonium phosphate may form a solution at higher pH values. In any case, the resulting slurry stream 36 discharged from unit 34 is passed to solids filter 37, from which a solids filter cake stream 38 is discharged. Solids stream 38 contains a minor amount of phosphate values, together with concentrated proportions of impurities including aluminum, uranium and rare earths values. Stream 38 may be processed in accordance with the procedure of U.S. Patent No. 3,126,249, to recover aluminum and uranium values.

A clear aqueous solution stream 39 is discharged from unit 37. Stream 39 is now relatively free of impurities such as fluorine, iron and calcium, and consists primarily of an aqueous solution containing dissolved ammonium nitrate and monoammonium acid phosphate. Because of the elimination of impurities as described supra, the subsequent solid nitrophos fertilizer product produced from stream 39 by water removal, as will appear infra, is relatively pure and reversion of phosphate values to a citrate-insoluble form is substantially prevented. Stream 39 is now passed to evaporator 40, which in most cases consists of a vacuum crystallizer which is heated by steam coil 41. Water vapor is removed from unit 40 via stream 42, which generally extends to a source of vacuum such as a steam jet exhauster. The removal of water in unit 40 causes the selective precipitation of nitro-phosphate crystals consisting primarily of monoammonium phosphate, in an aqueous mother liquor solution principally containing dissolved ammonium nitrate. The resulting slurry stream 43 discharged from unit 40 is passed to solids filter 44, from which solid filter cake stream 45 consisting of product nitrophos fertilizer principally containing monoammonium phosphate is passed to product utilization.

A clear mother liquor stream 46 is also removed from filter 44. Stream 46 consists essentially of an aqueous ammonium nitrate solution, and stream 46 is now preferably passed to evaporator 47 for heating via steam coils 48 to produce a substantially anhydrous ammonium nitrate melt for prilling.

Returning to solids filter 9, a portion of the discharge clear solution stream 23 is preferably utilized via stream 24 for the production of feed grade dicalcium phosphate co-product. In this case, sufficient ammonia will be added to unit 6 via stream 7 to produce a somewhat higher pH in the range of about 2.1 to 2.5 in unit 6, so as to attain greater precipitation of impurities in unit 6 for removal via stream 10, with solution stream 23 consequently being at a higher pH of 2.1 to 2.5 and therefore being relatively impurity-free. Stream 24 is withdrawn as a portion of stream 23, and is an aqueous solution containing dissolved calcium nitrate, ammonium nitrate and phosphate values in the form of phosphoric acid and monoammonium acid phosphate, in equilibrium with monocalcium phosphate. Stream 24, is passed into neutralizer vessel 49 together with ammonia stream 50, which serves to raise the solution pH to a level generally in the range of about 3.0 to 6.0, and to precipitate solid and relatively pure crystalline dicalcium phosphate in aqueous solution. The resulting slurry stream 51 discharged from unit 49 is passed to solids filter 52, from which solid filter cake stream 53 consisting of substantially pure or feed grade dicalcium phosphate is removed and passed to product utilization.

A clear solution stream 54 containing dissolved calcium nitrate and ammonium nitrate is discharged from unit 52, and passed to conversion vessel 55, in which calcium ions are precipitated as solid calcium carbonate by the in situ formation of ammonium carbonate in solution. Ammonia stream 56 and carbon dioxide stream 57 are passed into unit 55, and essentially form ammonium carbonate in the aqueous solution, which reacts with dissolved calcium nitrate to form solid calcium carbonate and further dissolved ammonium nitrate. The slurry stream 58 discharged from unit 55 is passed into solids filter 59, from which solid calcium carbonate filter cake stream 60 is discharged to waste disposal.

The clear solution stream 61 discharged from unit 59 consists of an aqueous ammonium nitrate solution, which is passed to concentrator 47 together with stream 46 as described supra. The combined aqueous ammonium nitrate solution in unit 47 is evaporated to produce a concentrated solution or substantially anhydrous melt, by circulating steam or other heating medium through coil 48. Evaporated water vapor is discharged from unit 47 via stream 62. Unit 47 may be of an alternative falling film evaporator configuration in practice, in which case streams 46 and 61 would flow downwards as a liquid film on the inner surfaces of vertical tubes, through which a heated air stream is circulated, with steam heating external to the tubes. In any case, a substantially anhydrous ammonium nitrate melt stream 63 is produced by unit 47, which may be of any suitable configuration to accomplish this result. Stream 63 is now sprayed or otherwise dispersed into the top of prilling tower 64, which is of conventional configuration and is usually air-ventilated. Solid prills of ammonium nitrate are formed in unit 64, and the resulting product stream 65 consisting of ammonium nitrate prills is passed to product utilization, such as in fertilizer usage. As mentioned supra, the solid prills of stream 65 are of improved form and configuration, due to the presence of small amounts of solid ammonium sulfate and ammonium phosphate in the prill structure, which provide an improved form of prill structure which resists disintegration at the transition point.

Numerous alternatives within the scope of the present invention, besides those mentioned supra, will occur to those skilled in the art. The ranges of process variables enumerated supra, such as solution concentrations and pH and temperature ranges, constitute preferred embodiments for optimum utilization of the process concepts of the present invention, and the invention may be practices outside of these ranges in suitable instances, with the exception of the pH of the solutions in units 6 and 34 formed by the respective ammoniation steps. It will be evident that the various reaction, digestion and solids precipitation vessels may be provided with suitable mixing and agitation devices in practice, such as element 4. The precipitation of a solid calcium salt from process stream 54, with the concomitant formation of further ammonium nitrate in solution, may be attained in practice by reacting the dissolved calcium nitrate with any suitable ammonium salt having an anion which forms an insoluble salt with the calcium cation, such as ammonium sulfate. Some or all of the solids filters 9, 19, 31, 37, 44, 52 and 59 may in practice consist of any suitable device or apparatus for separating a solid phase from a liquid phase, such as a centrifugal separator, a vacuum drum filter, a plate and frame filter press or the like. The calciner 11 preferably consists of a rotary kiln, however unit 11 may alternatively consist of a fluid bed roaster or calciner or the like, which may be heated by any suitable heating means or elements. For example, unit 11 could consist of a vertically oriented fluid bed roaster, with powdered coal or other suitable fuel such as a fluid hydrocarbon fuel being directly injected into the fluid bed or added to stream 10. In some cases, the ancillary production of feed grade dicalcium phosphate as a coproduct may not be desired or warranted by market conditions, in which case stream 24 would be eliminated, with all of stream 23 passing to further processing via stream 25 and units 49, 52, 55 and 59 being omitted from the process sequence. In some instances streams 46 and 61, or stream 63, may be directly passed to product utilization as solution-type fertilized products of high ammonium nitrate content. If liquid stream 63 is a product of the process, it will be evident that unit 47 will be operated so as to produce stream 63 as a concentrated aqueous ammonium nitrate solution, rather than as an anhydrous melt.

An example of a batch-wise laboratory scale investigation of the process of the present invention will now be described.

EXAMPLE

Ground Florida phosphate rock was employed in the laboratory scale investigation of the process, and the optional ancillary production of feed grade dicalcium phosphate was omitted from the laboratory study. The compositions of the various principal process streams were anlyzed and the analysis was reported in terms of equivalent weight percent of the respective component expressed as a suitable analytical product, thus phosphorus content was expressed as equivalent phosphorus pentoxide content by weight. In addition, solution concenrtations are expressed as percent by weight of the respective component in aqueous solution. Following are the test results of the laboratory-scale practice of the process. Table I presents data relative to the principal process streams bearing significant phosphate values, and Table II provides data relative to the balance of the process streams employed or obtained in the batch-type laboratory investigation. Table III presents data relative to conditions maintained in the principal process units described supra.

TABLE I.—PRINCIPAL SOLID PHOSPHATE-BEARING STREAMS

| Stream Noumber | 1 | 10 | 15 | 38 | 45 |
|---|---|---|---|---|---|
| Mass, grams | 500 | 170 | 135 | 37 | 262 |
| Analysis, wt. percent: | | | | | |
| Total $P_2O_5$ | 33.60 | 25.9 | | 28.8 | 52.0 |
| $H_2O$ soluble $P_2O_5$ | 0 | | | | 51.0 |
| Citrate insoluble $P_2O_5$ | 33.60 | | | | 0.05 |
| CaO | 48.00 | 36.0 | | 11.9 | 4.50 |
| F | 3.60 | 10.0 | 2.25 | 7.1 | 0.05 |
| $Fe_2O_3$ | 0.80 | 2.30 | | 1.0 | 0.08 |
| $Al_2O_3$ | 1.78 | 3.60 | | 8.62 | 0.11 |
| $U_3O_8$ | 0.01 | | | 0.087 | |
| Total N | | | | | 11.20 |
| $NH_3$—N | | | | | 10.90 |
| $SO_4$ | | | | 1.54 | 8.70 |
| $H_2O$ | | | | | 0.10 |

TABLE II.—PROCESS STREAMS EMPLOYED OR OBTAINED OF NEGLIGIBLE PHOSPHATE CONTENT

| Stream No | 2 | 7 | 17 | 20 | 26 | 29 | 32 | 35 | 46 |
|---|---|---|---|---|---|---|---|---|---|
| Mass, grams | 2,175 | [1]275 | 370 | 42 | 125 | 1,420 | 610 | [1]175 | [1]1,00 |
| Specific gravity | | 0.90 | | | | | | 0.90 | 1.340 |
| Analysis, wt. percent: | | | | | | | | | |
| Total $P_2O_5$ | | | | | 3.40 | | 1.00 | | 1.0 |
| $H_2O$ soluble $P_2O_5$ | | | | | | | 0.65 | | |
| CaO | | | | | | | 34.50 | | 0.05 |
| F | | | | | | | 0.02 | | 0.01 |
| $Fe_2O_3$ | | | | | 10.70 | | 0.02 | | 0.10 |
| $Al_2O_3$ | | | | | 0.10 | | 0.04 | | 0.30 |
| $SiO_2$ | | | | | 58.00 | | | | |
| Total N | | | | | | | 0.40 | | 23.0 |
| Ammonium nitrate N | | | | | | | | | 21.5 |
| $SO_4$ | | | | | | | 59.0 | | 3.20 |
| $H_2O$ | 75 | 72 | 58 | | 58 | 60 | | 72 | 30.0 |
| $HNO_3$ | 25 | | 42 | | 42 | | | | |
| $NH_3$ | | 28 | | | | | | 28 | |
| $(NH_4)_2SO_4$ | | | | 40 | | | | | |

[1] Volume in milliliters.

TABLE III.—OPERATING CONDITIONS IN PROCESS UNIT

| Process unit | Temp., °C. | pH |
|---|---|---|
| 3 [1] | 61 | |
| 6 | 53 | 2.1 |
| 11 | 800 | |
| 16 | 70 | |
| 22 | | 0.4 |
| 28 | | 1.0 |
| 34 | | 3.75 |

[1] Digestion period duration was 45 minutes.

In summary, it will be evident that the nitrophos product obtained from unit 44 as stream 45 possesses highly valuable fertilizer characteristics, specifically with respect to total phosphate content and phosphate solubility, as evidenced by the analysis data for stream 45 in Table I supra. In addition, at least 81% of the input phosphate values is recovered in the final nitrophosphate fertilizer product. Further phosphate values may be recovered from stream 38, as well as alumina, uranium and rare earth values, by processing such as disclosed in U.S. Pat. No. 3,126,249.

What is claimed is:

1. A process for the production of nitrophosphate fertilizer by the nitric acid acidulation of phosphate rock which comprises
   (a) digesting phosphate rock with a first nitric acid stream, whereby a solution is formed at a pH in the range of about 0.3 to 1.5 and a temperature in the range of about 55° C. and 80° C., said solution containing dissolved phosphate,
   (b) adding ammonia to said solution, whereby the pH of said solution is raised to the range of about 1.8 to about 2.5, and a major portion of the fluoride and iron phosphate in said solution are precipitated,
   (c) filtering said solution to remove precipitated solids, whereby a solid filter case is separated from residual clear solution,
   (d) calcining said solid filter cake at elevated temperature in the range of about 500° C. to 1000° C., whereby contained fluorine is volatilized and iron phosphate is decomposed to form nitric acid-insoluble iron compounds,
   (e) digesting the calcined filter cake with a second nitric acid stream at a temperature in the range of about 60° C. to 90° C., whereby a slurry is formed containing phosphate and aluminum values in the liquid phase,
   (f) filtering said slurry, whereby a solid phase containing iron compounds and silica is removed from the clear liquid phase,
   (g) combining the clear liquid phase from step (f) with said residual clear solution of step (c), to form a combined solution at a pH below 2.5, and adding nitric acid to the combined solution to effect a pH below 1.0,
   (h) adding a soluble salt to said combined solution, said soluble salt being selected from the group consisting of soluble sulfate and soluble carbonates which form an insoluble solid salt with the calcium cation in said combined solution, whereby calcium nitrate in said combined solution is reacted to form a soluble nitrate and an insoluble solid calcium salt,
   (i) filtering the resulting solution, whereby a solid phase principally consisting of a solid calcium salt is removed from the clear resulting solution,
   (j) adding ammonia to said clear resulting solution, whereby the pH of said solution is raised to the range of about 3.0 to about 4.5, and a solid precipitate containing impurities forms in said resulting solution,
   (k) filtering said solid precipitate from said resulting solution to produce a final solution containing dissolved ammonium phosphate and ammonium nitrate, and
   (l) removing water from said final solution, to produce a product nitrophos fertilizer containing ammonium phosphate.

2. The process of claim 1, in which water is removed from said final solution according to step (1), and product nitrophos fertilizer is produced, by evaporating water from said solution to produce solid nitrophos crystals in an aqueous mother liquor solution principally containing dissolved ammonium nitrate, separating said solid nitrophos crystals from said aqueous mother liquor solution, and recovering product ammonium nitrate from said aqueous mother liquor solution.

3. The process of claim 2, in which product ammonium nitrate is recovered from said aqueous mother liquor solution by evaporating water from said mother liquor solution to produce a substantially anhydrous melt principally containing ammonium nitrate together with minor amounts of impurities including ammonium phosphate and ammonium sulfate, and prilling said melt to produce a solid prills product principally containing ammonium nitrate.

4. A process for the production of nitrophosphate fertilizer by the nitric acid acidulation of phosphate rock which comprises
   (a) digesting phosphate rock with a first nitric acid stream, whereby a solution is formed at a pH in the range of about 0.3 to 1.5 and a temperature in the range of about 55° C. to 80° C., said solution containing dissolved phosphate,
   (b) adding ammonia to the solution formed according to step (a), whereby the pH of said solution is raised to the range of about 1.8 to about 2.5, and a major portion of the fluoride and iron phosphate contained in said solution are precipitated from said solution,
   (c) filtering the solution produced by step (b), whereby a solid filter cake is separated from a residual clear solution,
   (d) calcining the solid filter cake produced by step (c) at a temperature in the range of 500° C. to 1000° C., whereby a major portion of the contained fluorine is volatilized and iron phosphate is decomposed to form iron compounds insoluble in nitric acid,
   (e) digesting the calcined filter cake with a second nitric acid stream at a temperature in the range of about 60° C. to 90° C., whereby a slurry is formed, said slurry containing phosphate and aluminum values from said calcined cake in the liquid phase,
   (f) filtering said slurry, whereby a solid phase containing iron compounds and silica is removed from the liquid phase containing dissolved phosphate,
   (g) combining the liquid phase from step (f) with said residual clear solution formed by step (c),
   (h) adding nitric acid to the combined liquid solution formed by step (g), whereby the pH of said solution is lowered to the range of about 0.3 to 0.7,
   (i) adding a soluble sulfate salt selected from the group consisting of ammonium sulfate and potassium sulfate to the acidified solution of step (h), whereby solid calcium sulfate is precipitated from said solution and a soluble nitrate is formed in said solution,
   (j) filtering the resulting solution to remove precipitated solid calcium sulfate and produce a clear resulting solution,
   (k) adding ammonia to said clear resulting solution, whereby the pH of said solution is raised to the range of about 3.0 to about 4.5, and a solid precipitate containing impurities forms in said resulting solution,
   (l) filtering said solid precipitate from said resulting solution to produce a final solution containing dissolved ammonium phosphate and ammonium nitrate, and
   (m) removing water from said final solution, to produce product nitrophos fertilizer containing ammonium phosphate.

5. The process of claim 4, in which said soluble salt added according to step (i) is ammonium sulfate.

6. The process of claim 4, in which said soluble salt added according to step (i) is potassium sulfate.

7. The process of claim 4, in which water is removed from said final solution according to step (m), and product nitrophos fertilizer is produced, by evaporating water from said solution to produce solid nitrophos crystals in an aqueous mother liquor solution principally containing dissolved ammonium nitrate, separating said solid nitrophos crystals from said aqueous mother liquor solution, and recovering product ammonium nitrate from said aqueous mother liquor solution.

8. The process of claim 7, in which product ammonium nitrate is recovered from said aqueous mother liquor solution by evaporating water from said mother liquor solution to produce a substantially anhydrous melt principally containing ammonium nitrate together with minor amounts of impurities including ammonium phosphate and ammonium sulfate, and prilling said melt to produce a solid prills product principally containing ammonium nitrate.

References Cited

UNITED STATES PATENTS

| | | | |
|---|---|---|---|
| 1,849,703 | 3/1932 | Boller | 71—39 |
| 2,849,280 | 8/1958 | Le Baron et al. | 71—39X |
| 2,899,293 | 8/1959 | Munekata | 71—39X |
| 2,942,967 | 6/1960 | Caldwell | 71—39 |
| 2,985,527 | 5/1961 | Nossen | 71—39 |

SAMIH N. ZAHARNA, Primary Examiner

B. H. LEVENSON, Assistant Examiner

U.S. Cl. X.R.

23—66, 103, 122; 71—39, 58, 63